UNITED STATES PATENT OFFICE.

HENRY WIEDERHOLD, OF PHILADELPHIA, PENNSYLVANIA, ASSIGNOR TO THE BARBER ASPHALT PAVING COMPANY, OF PHILADELPHIA, PENNSYLVANIA, A CORPORATION OF WEST VIRGINIA.

BITUMINOUS LINING FOR SURFACES EXPOSED TO CORROSIVE ACTION.

1,305,678.     Specification of Letters Patent.     Patented June 3, 1919.

No Drawing.     Application filed January 2, 1915. Serial No. 204.

*To all whom it may concern:*

Be it known that I, HENRY WIEDERHOLD, of Philadelphia, in the county of Philadelphia and State of Pennsylvania, have invented certain new and useful Improvements in Bituminous Linings for Surfaces Exposed to Corrosive Action, whereof the following is a specification.

My invention relates to a bituminous composition for use in lining tanks and other surfaces which are exposed to the corrosive action of acid or alkaline fumes or liquids.

Attempts have heretofore been made to prepare a mastic for the lining of surfaces exposed to corrosive action. Especially has this attempt been made in the lining of acid tanks used in various industries; but experience has shown that the mastics thus produced have not been able to withstand the action of the acid, but have disintegrated as a result of such action. Such mastics have usually been made from the calcareous rock asphalts which consist essentially of about ninety per cent. lime-stone, and ten per cent. bitumen or maltha, and occur extensively as such in nature. Somewhat similar artificial mixtures of asphaltum and pulverized lime-stone have been prepared and used for the same purpose.

I have discovered that the cause of the failure of these mastics is that the particles of calcareous rock which such natural or artificially prepared compositions of asphaltum or bitumen have contained are disintegrated when exposed to acid or alkaline solutions or corrosive gases even though the mineral aggregate of such compositions is completely embedded within and therefore covered by a bitumen which in itself is not affected by such agents.

In order to overcome this difficulty, I have prepared a bituminous composition which is especially useful and valuable for the purpose of lining large tanks constructed from hydraulic concrete for use in metallurgical processes and other industries in which mineral acids are employed. This composition is prepared by employing asphaltum such as Trinidad asphalt or Bermúdez asphalt or gilsonite or similar asphalts, free from calcareous material, or even that produced by the manipulation of oils with an asphaltic base, and combining such asphalt or a mixture of such asphalts, in a melted or fluid condition, with a graded mineral aggregate of rock such as quartz, granite, trap or other igneous rock, which is entirely free from carbonates. I find that a suitable proportion in which to combine these materials is asphaltum from 15 to 35 parts, finely powdered igneous rock, sand or clay not any coarser than one-tenth of an inch, from 25 to 50 parts, and coarser mineral particles of igneous rock, sand or clay between one-tenth and one-fourth of an inch, from 30 to 45 parts. An aggregate so graded may be said to vary in size from dust to coarse sand or grit.

The materials as above specified in substantially the proportions described are mixed together in a suitable kettle or mechanical device by first melting the asphaltum under heat and then adding the mineral aggregate and stirring the mass until each particle of the mineral aggregate is coated with the asphaltum, and the composition is in such condition that it may be spread out upon or cast against the surface of the supporting structure, whether concrete, wood or metal. Such composition is plastic and may be spread as mastic or cast into forms at temperatures in excess of 250° F. When set it will retain its form and place at temperatures below 125° F. In view of the fact that all rock does not crush with the same fracture, or to the same grading as to size, it is obvious that the proportion of fine and coarse particles in the mineral aggregate and also of the asphaltum must necessarily be varied to some extent and within reasonable limitations in order to produce a composition having the working properties desired.

For practical purposes the mineral matter which I have found objectionable if present in a mastic intended for the purpose described, is for the most part a carbonate of a lime or magnesia base, and this for convenience I refer to as rock containing carbonates. In like manner the igneous rocks such as I have mentioned are silicious in their nature and therefore free from elements upon which the corrosive fumes or liquids to which I have referred act.

Having thus described my invention, I claim:

1. A bituminous composition for use as a protective lining for tanks or the like, formed by combining asphaltum free from calcareous material, with a mineral aggregate consisting of particles graded in size from grit to dust, said particles being substantially free from carbonates, which are mechanically acted upon by said corrosive fumes or liquids.

2. A bituminous composition for use as a protective coating for surfaces exposed to the action of corrosive fumes or liquids, containing in combination about 15 to 35 parts of asphaltum free from calcareous material, fine non-calcareous mineral particles smaller than one-tenth of an inch, about 25 to 50 parts, and coarse mineral particles of igneous rock, larger than one-tenth of an inch, about 30 to 45 parts.

In testimony whereof, I have hereunto signed my name at Philadelphia, Pennsylvania, this thirtieth day of December, 1914.

HENRY WIEDERHOLD.

Witnesses:
JAMES H. BELL,
E. L. FULLERTON.